United States Patent
Eibye

(10) Patent No.: US 9,015,029 B2
(45) Date of Patent: Apr. 21, 2015

(54) CAMERA DICTIONARY BASED ON OBJECT RECOGNITION

(75) Inventor: Anders Bertram Eibye, Copenhagen (DK)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2380 days.

(21) Appl. No.: 11/757,586

(22) Filed: Jun. 4, 2007

(65) Prior Publication Data

US 2008/0300854 A1   Dec. 4, 2008

(51) Int. Cl.
*G06F 17/28* (2006.01)
*G06K 9/32* (2006.01)
*G06K 9/22* (2006.01)

(52) U.S. Cl.
CPC ............ *G06K 9/325* (2013.01); *G06K 9/228* (2013.01)

(58) Field of Classification Search
USPC .......................... 704/3; 340/539.13; 382/224
See application file for complete search history.

(56) References Cited

U.S. PATENT DOCUMENTS

| | | | |
|---|---|---|---|
| 5,222,160 A * | 6/1993 | Sakai et al. | 382/185 |
| 7,277,846 B2 * | 10/2007 | Satoh | 704/3 |
| 2001/0056342 A1 * | 12/2001 | Piehn et al. | 704/3 |
| 2003/0044068 A1 * | 3/2003 | Kagehiro et al. | 382/182 |
| 2003/0164819 A1 * | 9/2003 | Waibel | 345/173 |
| 2005/0007444 A1 | 1/2005 | Yamazaki et al. | |
| 2005/0114145 A1 * | 5/2005 | Janakiraman et al. | 704/277 |

FOREIGN PATENT DOCUMENTS

| | | |
|---|---|---|
| JP | 2000-194698 | 7/2000 |
| WO | WO 01/04790 A1 | 1/2001 |
| WO | WO 03/032237 A1 | 4/2003 |

OTHER PUBLICATIONS

International Search Report and Written Opinion dated Mar. 20, 2008 issued in corresponding PCT application No. PCT/IB2007/054876, 14 pages.
Jie Yang et al.: "An Automatic Sign Recognition and Translation System", Interactive System Laboratory, Nov. 2001, 8 pages.
Marcel Germann: "Object Recognition with Mobile Phones", 2005. http://www.masi.li/own/ethprojects/st2/report.pdf, 38 pages.

* cited by examiner

*Primary Examiner* — Douglas Godbold
*Assistant Examiner* — Mark Villena
(74) *Attorney, Agent, or Firm* — Snyder, Clark, Lesch & Chung, LLP

(57) ABSTRACT

A portable device may include a camera to capture a picture or a video, object recognition logic to identify a target object within the picture or the video captured by the camera, and output a first string corresponding to the identified target object, logic to translate the first string to a second string of another language that corresponds to the identified target object, and logic to display on a display or store in a memory the second string.

17 Claims, 6 Drawing Sheets

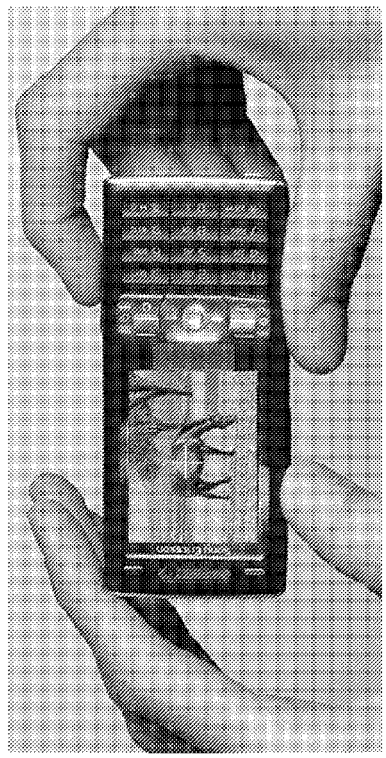 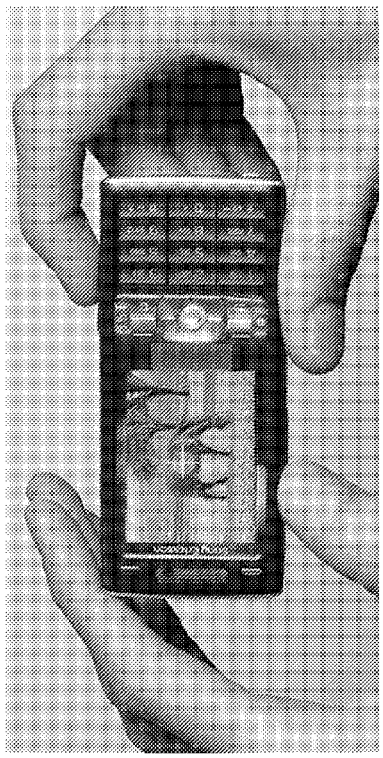
Fig. 5a
Fig. 5b

CAMERA DICTIONARY BASED ON OBJECT RECOGNITION

BACKGROUND

The proliferation of devices, such as hand-held or portable devices, has grown tremendously within the past decade. While the more popular devices among users may be mobile phones, other devices, such as language translator devices, satisfy an ongoing need in both personal and business settings.

Today, users may rely on, for example, translation pens or electronic dictionaries that possess language translation functionality. These types of devices may provide language translation based on a user inputting printed text, and may have a fixed set of languages.

SUMMARY

According to one aspect, a portable device may include a camera to capture a picture or a video, object recognition logic to identify a target object within the picture or the video captured by the camera, and output a first string corresponding to the identified target object, logic to translate the first string to a second string of another language that corresponds to the identified target object, and logic to display on a display or store in a memory the second string.

Additionally, the portable device may include a target object indicator to indicate the target object within the picture or the video.

Additionally, the target object indicator is at least one of a highlighted line having a shape substantially corresponding to a contour of the target object or cross-hairs.

Additionally, the portable device may include logic to display a list of selectable languages that the logic to translate uses to translate the first string.

According to another aspect, a portable device may include a camera to capture an image, a display, logic to display on the display a target object indicator that indicates a target object within the image, logic to automatically transmit to an external device the image, and the target object indicator, when the image is being captured, logic to receive from the external device a string corresponding to an identified target object, and logic to display on the display a text string corresponding to the identified target object.

Additionally, the portable device may include logic to identify the class of the target object, where class information is output to the logic to automatically transmit.

Additionally, where the target object indicator is at least one of a highlighted line having a shape substantially corresponding to a contour of the target object, or cross-hairs.

Additionally, the portable device may include logic to receive a selection from an input component, and output the selection to the logic to automatically transmit.

Additionally, the portable device may include logic to receive a geographic location of the portable device from a global positioning component, and output the geographic location to the logic to automatically transmit.

Additionally, the portable device may include a translator to translate the received string to the text string based on a language selection output from an input component, or based on geographic location information from a global positioning component.

According to still another aspect, a method may include capturing an image of a target object, performing object recognition based on the image of the target object, determining a string corresponding to the recognized object, identifying a language, translating the string into a text string of the identified language, and displaying or storing the translated text string.

Additionally, the capturing may include indicating the target object within the image when capturing the image.

Additionally, the indicating may include displaying a target object indicator.

Additionally, the target object indicator may include at least one of a highlighted line having a shape substantially corresponding to a contour of the target object, or cross-hairs.

Additionally, the performing may include receiving the image of the target object as the image of the target object is being captured.

Additionally, the receiving may include receiving target object indicator information indicating the target object within the image.

Additionally, the identifying may include determining the location of a device capturing the image of the target object, and determining the language based on the location of the device.

Additionally, the identifying may include identifying the language based on a user's selection.

According to a further aspect, a computer-readable medium having stored thereon sequences of instructions which, when executed by at least one processor, may cause the at least one processor to perform object recognition based on an image of a target object, determine a language of a text string corresponding to the target object, and display or store the text string in the determined language.

According to another aspect, a device may include means for identifying an image of a target object, means for recognizing the target object within the image, means for determining a geographic location of the device, means for determining a language based on the geographic location, means for determining a text string corresponding to the target object in the determined language, and means for displaying or storing the text string.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings:

FIGS. 5a-5d are flow diagrams illustrating exemplary processes for performing translation features based on object recognition.

DETAILED DESCRIPTION

The following detailed description refers to the accompanying drawings. The same reference numbers in different drawings may identify the same or similar elements. Also, the following detailed description does not limit the invention.

Overview

Implementations described herein provide translation features based on object recognition. In one implementation, for example, a device, such as a portable device having a camera and a display may permit a user to capture an image (e.g., a picture or a video) of an object (e.g., a horse). Object recognition may reside in the device or external to the device, such as in a network or in another device. Object recognition may recognize the object based on the captured image. In one implementation, object recognition may provide a string to a translator, where the string may correspond to the recognized object. The translator may reside in the device or external to the device, such as in a network or in another device. "String", as used herein, may include one or more characters (e.g., letters, numbers, and/or symbols). The string (e.g. "horse" in English) may correspond to the recognized object. The translator may, for example, translate the string to another language (e.g., Italian), and forward the translated string to the device. The display of the device may display or store the translated string. For example, the device may display or store the translated string "cavallo", which is Italian for "horse".

The description to follow will describe an exemplary device and method including translation features based on object recognition. In practice, implementations of a device and/or method may include, for example, hardware, software, combinations of hardware and software, or a hybrid architecture, in order to realize these translation features based on object recognition.

Exemplary Device

Figure 1:
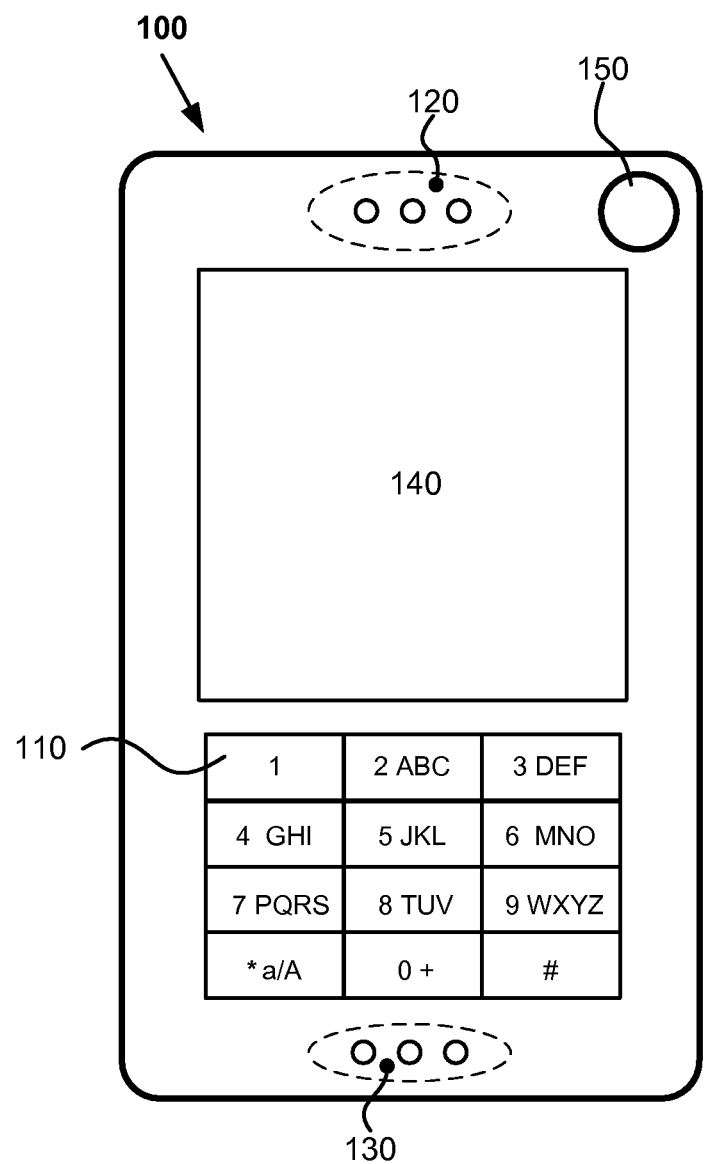
FIG. 1 is a diagram of an exemplary portable device.

FIG. 1 illustrates an exemplary device 100. For discussion purposes only, consider device 100 as a portable device, such as a mobile phone. In other implementations, device 100 may be any other type of, for example, communicative, computational, image capturer and/or audio-visual (AV) player/recorder device. As illustrated in FIG. 1, device 100 may include keypad 110, speaker 120, microphone 130, display 140, and camera 150. FIG. 1 illustrates exemplary external components of device 100. Accordingly, device 100 may include fewer, additional, or different external components. The external components of device 100 may be arranged differently than those illustrated in FIG. 1. In addition, the external components of device 100 may include other functional/operational/structural features than those exemplarily described below.

Keypad 110 may include any component capable of providing input to device 100. As illustrated in FIG. 1, keypad 110 may include a standard telephone keypad and/or a set of function keys. The buttons of keypad 110 may be pushbuttons, touch-buttons, and/or a combination of different suitable button arrangements. A user may utilize keypad 110 for entering information, such as selecting functions and responding to prompts.

Speaker 120 may include any component capable of providing sound to a user. Microphone 130 may include any component capable of sensing sound of a user.

Display 140 may include any component capable of providing visual information to a user. Display 140 may be utilized to display text, images, and/or video to a user. Camera 150 may include any component capable of capturing an image (e.g., a picture or a video). Display 140 may be utilized as a viewfinder when a user captures an image with camera 150. An antenna (not illustrated) may be built internally into device 100, and hence is not illustrated in FIG. 1.

Figure 2:
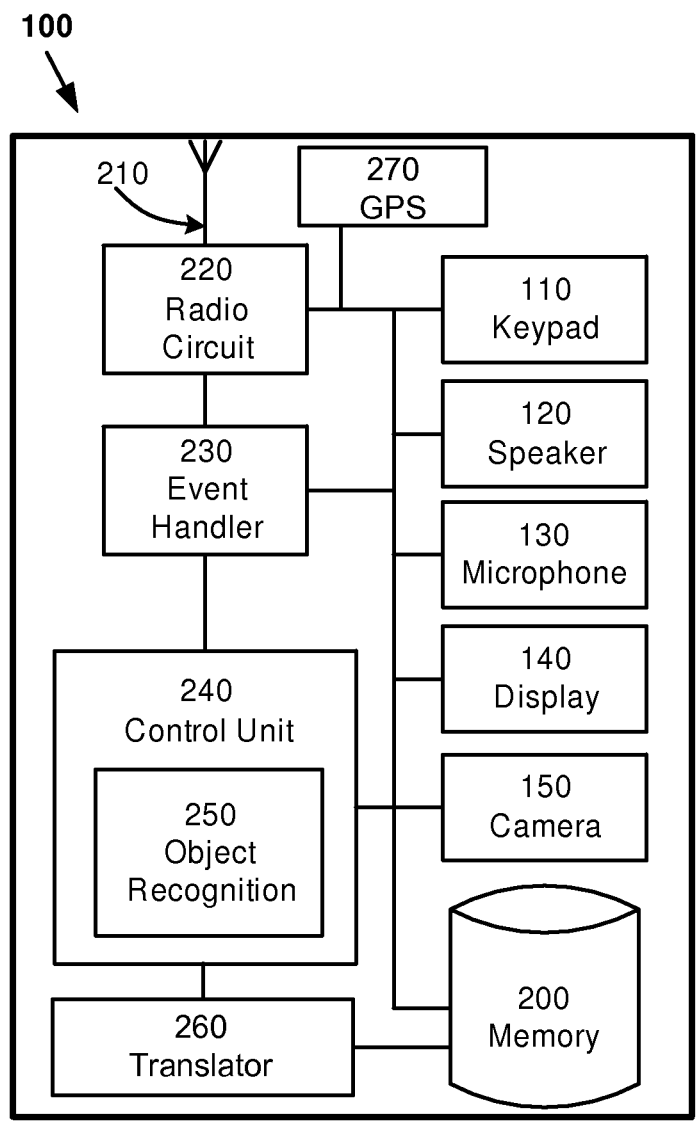
FIG. 2 is a diagram of exemplary components of the portable device of FIG. 1.

FIG. 2 illustrates exemplary internal components of device 100. As illustrated in FIG. 2, device 100 may include keypad 110, speaker 120, microphone 130, display 140, camera 150, memory 200, antenna 210, radio circuit 220, event handler 230, control unit 240, object recognition 250, translator 260, and global positioning system (GPS) 270. No further discussion relating to components previously described with respect to FIG. 1 is provided. FIG. 2 illustrates exemplary internal components of device 100. Accordingly, device 100 may include fewer, additional, or different internal components. The internal components of device 100 may be arranged differently than those illustrated in FIG. 2. In addition, the internal components of device 100 may include other functional/operational/structural features than those exemplarily described below.

Memory 200 may include any type of storing component. For example, memory 200 may include a memory component, such as random access memory (RAM), a read only memory (ROM), and/or a programmable read only memory (PROM). Alternatively, or additionally, memory 200 may include a storage component, such as an optical storage (e.g., a CD), a magnetic storage (e.g., a hard drive), or a computer-readable medium. The computer-readable medium may be any component that stores (permanently, transitorily, or otherwise) information readable by a machine. The computer-readable medium may include a physical or a logical memory device and/or a carrier wave. Memory 200 may store data and instructions related to the operation and use of device 100.

Antenna 210 and radio circuit 220 may include any component for enabling radio communication with, for example, a network or another device.

Event handler 230 may include any component for administrating events, such as incoming and outgoing information exchange to and from, for example, a network or other device.

Control unit 240 may include any processing logic that may interpret and execute instructions. "Logic", as used herein, may include hardware (e.g., an application specific integrated circuit (ASIC), a field programmable gate array (FPGA), etc.), software, a combination of software and hardware, and/or a hybrid architecture. Control unit 240 may include, for example, a microprocessor, a data processor, a co-processor, and/or a network processor. Control unit 240 may access instructions from memory 200 and/or from an external source (e.g., a network or a device). Control unit 240 may control the operation of device 100 and its components. As will be described in greater detail below, in one implementation, for example, control unit 240 may operate in a translation mode for device 100.

Object recognition 250 may include any logic that performs object recognition features, as described herein. In practice, object recognition 250 may be implemented employing hardware, software, a combination of hardware and software, and/or a hybrid architecture. Object recognition 250 may access instructions from memory 200, from other components of device 100, and/or from a source external to device 100 (e.g., a network or another device). For discussion purposes only, assume that object recognition 250 resides in device 100. In a different implementation, objection recognition 250 may reside in a network or in another device. In another implementation, device 100 may include a portion of object recognition 250 and the network or another device may include a remaining portion of object recognition 250. That is, for example, device 100 may perform some functions related to object recognition features, and the network or another device may perform other functions related to object recognition features. Thus, in the case where object recognition 250 does not entirely reside in device 100 and/or entirely perform object recognition in device 100, device 100 may establish communication with, for example, the network or another device, for object recognition features to be performed. Object recognition 250 may provide object recognition for two-dimensional (2D) objects (e.g., a painting, a photograph) and/or three-dimensional (3D) objects (e.g., a horse) of multiple classes.

It is to be understood that object recognition 250 may be implemented in a number of ways to achieve object recognition features. Accordingly, the implementations described below are exemplary in nature, and fewer, additional, or different components and/or processes may be employed to realize object recognition features. Additionally, the implementations described below are not restricted to the order in which they have been described below.

In one implementation, the image (e.g., a picture or a video) captured from camera 150 may be used by object recognition 250 to perform, for example, object categorization and object identification. For example, a video (e.g., 30 frames/per second) from camera 150 may be fed to object recognition 250 in real-time (i.e., as the video is being captured). In one implementation, for example, object recognition 250 may include some preprocessing of the video feed (e.g., filtering, motion tracking, object localization). In one implementation, regional point descriptors that characterize some property of the image may be employed. Each regional point descriptor may surround a basis point. In another implementation, global and/or local approaches may be employed. In one implementation, a modeled-based comparison may be employed for determining discriminatory aspects of the specific object instance (i.e., target object). In one implementation, object recognition 250 may perform object recognition by referring to a database. The database may reside in memory 200. The database may include global image models and object specific identifiers that may be compared to the descriptors of the target object in the captured image.

Translator 260 may include any component that provides translation of information, such as string information, from one language to another language. In one implementation, translator 260 may include a database in memory 200. In one implementation, translator 260 may reside in device 100. In another implementation, for example, translator 260 may reside in a network or in another device.

GPS 270 may include any component that provides global positioning. GPS 270 may identify a geographic location of device 100. As will be discussed in greater detail below, in one implementation, geographic location information may be employed to determine in what language the string corresponding to the image of the target object is to be translated. In another implementation, for example, a user of device 100 may select a language so that GPS 270 may not be needed. In still another implementation, a communication link between device 100 and the network or another device may contain information (e.g., header information or routing information) that may be utilized to determine general geographic location information of device 100.

Exemplary Method

Exemplary Method

Figure 3:
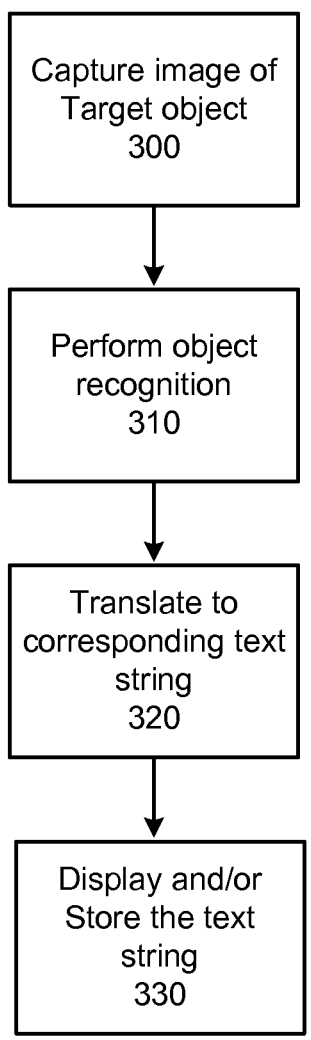
FIG. 3 depicts a flow chart of an exemplary process for performing translation features based on object recognition.

FIG. 3 depicts a flow chart of an exemplary process for performing translation features based on object recognition. For discussion purposes only, assume that a user of device 100 is on vacation in Rome, Italy, and sees a church, and wonders what the word for church in Italian is.

Block 300

Capture image of target object. The user of device 100 may use camera 150 to capture, for example, a picture or a video of the church. In one implementation, for example, when the user desires a translation to be performed, the user may select from a menu system to operate device 100 in translation mode. When device 100 is in translation mode the image captured by camera 150 may be fed directly to object recognition 250 in real time. In one implementation, camera 150 may include a picture mode and a video mode. Thus, in one implementation, for example, when a user is going to take a picture, an image of the church may appear in display 140 (e.g., a viewfinder) before the user actually presses, for example, a button to take a picture. This image may be fed directly to object recognition 250, in addition to an image (i.e., picture) captured after the button is pressed. In another implementation, for example, the user may not need to actually take a picture of the church. Rather, the image of the church that appears in the viewfinder may be fed directly to object recognition 250. Similarly, in one implementation, when a user is going to take a video, the video images may be fed to object recognition 250. In still another implementation, the user may retrieve stored images (e.g., a picture or a video) so that object recognition may be performed.

Further, when device 100 operates in translation mode, a target object indicator may be displayed in display 140. In one implementation, a visual overlay (e.g., cross-hairs), which may be movable by keypad 110, may permit the user to track and select the target object. The movable visual overlay may assist object recognition 250 in isolating and recognizing the target object from other background clutter in the image feed. Alternatively, or additionally, the target object indicator may include a highlighted line having a shape substantially corresponding to a contour of the target object. The highlighted line information may be utilized by object recognition 250 in isolating and recognizing the target object.

In one implementation, when device 100 may include a portion of object recognition 250 and a network, such as a WiFi network, or another device may include a remaining portion of object recognition 250, and/or device 100 may perform some functions related to object recognition features, and the network or another device may perform other functions related to object recognition features, device 100 may establish communication with, for example, the network or another device, for object recognition features to be performed. In another implementation, when object recognition 250 resides entirely in the network or in the other device, device 100 may establish communication with the network or the other device. In one implementation, when device 100 operates in translation mode, device 100 may automatically establish communication with the WiFi network or the other device, so that the image of the target object may be fed to object recognition 250 in real time. Alternatively, or additionally, in one implementation, device 100 may feed the target object indicator to the network or to the other device. In another implementation, for example, object recognition 250, residing in device 100, may determine a class of the target object (e.g., a four-legged animal). Thus, device 100 may provide the class of the target object, the image of the target object, and the target object indicator information, to the object recognition 250 residing in the WiFi network or the other device. In still another implementation, when the user retrieves a stored image(s), the user may establish communication with the WiFi network or the other device, and transmit the image of the target object, the target object indicator, and/or class of the target object, to the object recognition 250.

Block 310

Perform object recognition. Object recognition 250 may perform object recognition. When the target object is identified, object recognition 250 may output a string representing the target object to translator 260. In one implementation, for example, object recognition 250 may output a text string "church." Additionally, in one implementation, the text string may be displayed on display 140 in the user's native language to make sure that object recognition 250 correctly identified the target object. In another implementation, for example, object recognition may output a symbolic string or a numeric string.

Block 320

Translate to corresponding text string. Translator 260 may translate the string to an appropriate language. In one implementation, GPS 270 may provide geographic location information of device 100 that may be used for translation purposes. For example, since the user of device 100 is in Rome, Italy, translator 260 may determine that the appropriate language is Italian. In another implementation, when device 100 operates in translation mode and does not include GPS 270, a menu system, for example, may permit the user to select what language the string corresponding to the target object is to be translated. Depending on whether translator 260 resides in device 100 or, for example, in the network or in another device, device 100 may or may not establish communication with the network or the other device. The user may make such selection of language anytime prior to the display and/or storage of the translated string. Thus, this aspect of the exemplary process is not limited to block 320. In yet another implementation, when device 100 operates in translation mode and does not include GPS 270, information associated with the communication link between device 100 and object recognition 250 may provide general geographic location information (e.g., triangulation or roaming information) that may be used for translation purposes.

In one implementation, translator 260 may be optional. For example, object recognition 250 may output a text string representing the target object in the appropriate language based on location information.

Block 330

Display and/or store text string. Display 140 of device 100 may display the translation results. Alternatively, or additionally, the user of device 100 may save the translation results in memory 200 for later retrieval and use.

Example

Figure 4:
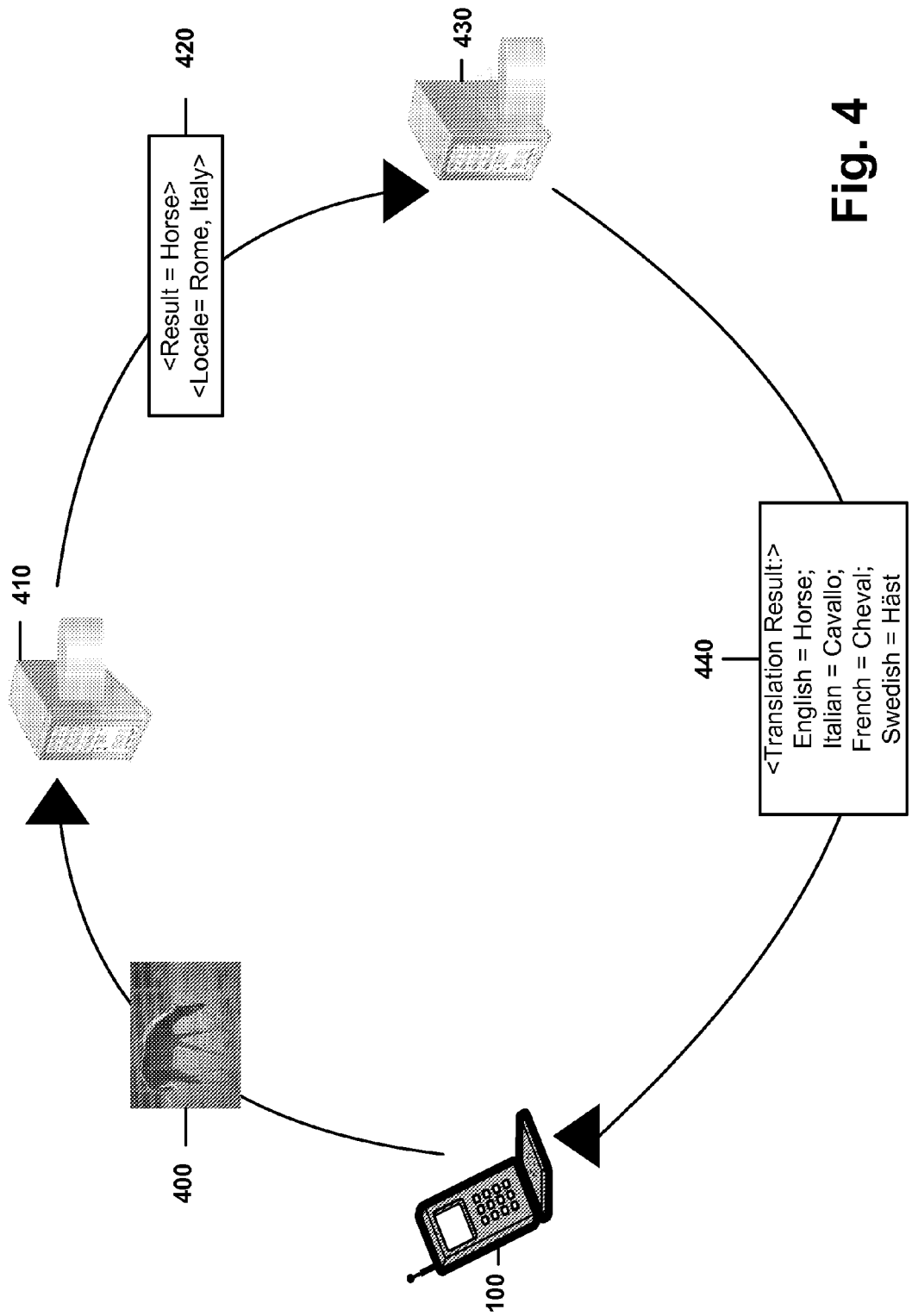
FIG. 4 is a diagram illustrating exemplary processes for performing translation features based on object recognition.

FIG. 4 is a diagram illustrating exemplary processes for performing translation features based on object recognition. FIG. 4 illustrates device 100 and exemplary network components, to be described in greater detail below. FIGS. 5*a*-5*d* are diagrams illustrating exemplary processes for performing translation features based on object recognition. FIGS. 5*a*-5*d* exemplarily illustrate a user and device 100, such as a mobile phone, from a user's perspective. FIG. 4 and/or FIG. 5*a*-5*d* may be associated with FIG. 3.

Figure 5C:
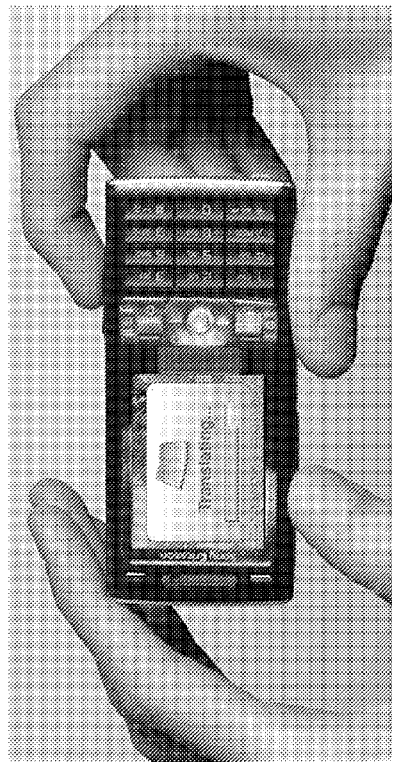

Referring to FIG. 4 and FIGS. 5*a*-5*d*, in an exemplary situation, assume that a user sees a horse, and wishes to know how to say horse in Italian. As illustrated in FIG. 5*a*, camera 150 and display 140 may permit a user of device 100 to capture a video image 400 of the horse. As illustrated in FIG. 5*b*, device 100 may permit the user to select the target object during the video capture. For example, in one implementation, a movable overlay (e.g., cross-hairs) may be visually seen in display 140 when the user is pointing camera 150 at the horse. Alternatively, or additionally, a visible contour line surrounding the target object may be displayed in display 140, as illustrated in FIG. 5*b*. The video image 400 and the target object indicators (i.e., the cross-hairs and/or the contour line) may be fed to object recognition 410 residing in the network of FIG. 4.

Figure 5D:
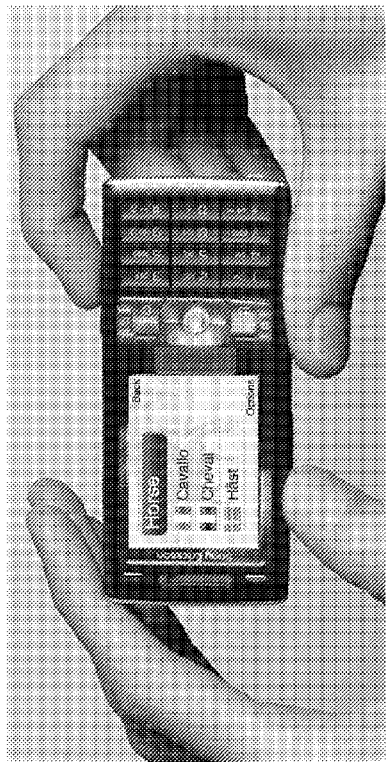

As illustrated in FIG. 4, object recognition 410 may perform object recognition and send output 420 to translator 430. Output 420 may include the string "horse" and locale information, such as Italy, Rome. Translator 430 may translate the received string and locale information and output translation result 440 to device 100. Translation result 440 may include more than one appropriate language. As illustrated in FIG. 5*c*, display 140 of device 100 may indicate to the user that translation is taking place. FIG. 5*d* illustrates translation result 440 displayed on display 140 of device 100.

Conclusion

Implementations described herein may provide translation features based on object recognition.

The foregoing description of exemplary embodiments provides illustration and description, but is not intended to be exhaustive or to limit the invention to the precise form disclosed. Modifications and variations are possible in light of the above teachings or may be acquired from practice of the invention. For example, in one implementation, components of objection recognition may reside in both a device and a network. For example, class identification aspects of object recognition may reside in the device, and object identification aspects that may include a database, for example, may reside in the network.

While a series of acts and/or processes have been described with regard to FIG. 4 and FIGS. 5*a*-5*d*, the order of the acts and/or processes may be modified in other implementations. For example, the language in which a target object is to be translated may be transmitted before or after object recognition is completed.

It should be emphasized that the term "comprises" or "comprising" when used in the specification is taken to specify the presence of stated features, integers, steps, or components but does not preclude the presence or addition of one or more other features, integers, steps, components, or groups thereof.

It will be apparent that aspects, as described above, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware could be designed to implement these aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A portable device, comprising:
   a camera to capture a picture or a video;
   object recognition logic to:
      identify a type of a target object within the picture or the video captured by the camera,
      identify the target object corresponding to the identified type of the target object, and
      output a first string corresponding to a term, descriptive of the identified target object, in a language associated with a user of the portable device;
   translation logic to translate the first string to a second string, corresponding to the term, in another language; and a display to display the first string, to allow the user to confirm that the term is accurate with respect to the identified target object, together with the second string.

2. The portable device of claim 1, further comprising:
a geographic location indicator to indicate a geographic location of the target object, where the translation logic is further to select the other language based on the geographic location.

3. The portable device of claim 1, further comprising:
a target object indicator to indicate the target object within the picture or the video, wherein the target object indicator comprises at least one of a highlighted line having a shape substantially corresponding to a contour of the target object, or cross-hairs.

4. A portable device, comprising:
a camera to capture an image;
a display;
logic to display, on the display, a target object indicator that indicates a target object within the image;
logic to obtain geographic location information associated with the portable device;
logic to automatically transmit, to an external device, the image, the geographic location information, and the target object indicator, as the image is being captured;
logic to receive, from the external device, a string corresponding to a term, descriptive of an identified target object;
a translator to translate the received string from a first language, associated with a user of the portable device, to a text string, in a language-associated with the geographic location information, corresponding to the term descriptive of the identified target object; and
logic to display, on the display, the received string, to allow the user to confirm that the term is accurate with respect to the identified target object, together with the text string.

5. The portable device of claim 4, further comprising:
logic to identify a class, from a plurality of classes, of the target object, wherein the class is output to the logic to automatically transmit.

6. The portable device of claim 4, wherein the target object indicator is at least one of a highlighted line having a shape substantially corresponding to a contour of the target object, or cross-hairs.

7. The portable device of claim 4, where the logic to obtain geographic location information comprises logic to receive a geographic location of the portable device from a global positioning component, and output the geographic location to the logic to automatically transmit.

8. The portable device of claim 4, further comprising:
a translator to translate the received string from a first language, associated with a user of the portable device, to the text string in the language-associated with geographic.

9. A method performed in a portable communication device, comprising:
capturing an image of a target object;
performing object recognition based on the image of the target object;
determining a string corresponding to a term, descriptive of the recognized target object, in a first language associated with a user of the portable communication device;
identifying a second language;
translating the string into a text string, corresponding to the term, in the second language; and
displaying the string, to allow the user to confirm that the term is accurate with respect to the recognized target object, together with the translated text string.

10. The method of claim 9, wherein the capturing comprises:
indicating the target object within the image when capturing the image.

11. The method of claim 9, wherein the indicating comprises:
displaying a target object indicator.

12. The method of claim 11, wherein the target object indicator comprises:
at least one of a highlighted line having a shape substantially corresponding to a contour of the target object or cross-hairs.

13. The method of claim 9, wherein the performing comprises:
receiving the image of the target object as the image of the target object is being captured.

14. The method of claim 13, wherein the receiving comprises:
receiving target object indicator information indicating the target object within the image.

15. The method of claim 9, wherein the identifying comprises:
determining a geographic location of the portable communication device when capturing the image of the target object; and
determining the second language based on the geographic location of the portable communication device.

16. The method of claim 9, the identifying comprises:
identifying the second language based on a selection input by the user.

17. A device, comprising:
means for capturing an image of a target object;
means for performing an identification of the target object;
means for displaying, to a user of the device, the identification of the target object in a language associated with the user, to allow the user to confirm an accuracy of the identification with respect to the target object;
means for determining a geographic location of the device;
means for determining a language based on the geographic location, where the determined language differs from the language associated with the user;
means for determining a text string, corresponding to the identification of the target object, in the determined language; and
means for displaying the text string together with the identification of the target object in the language associated with the user.

* * * * *

UNITED STATES PATENT AND TRADEMARK OFFICE
CERTIFICATE OF CORRECTION

| | | |
|---|---|---|
| PATENT NO. | : 9,015,029 B2 | Page 1 of 1 |
| APPLICATION NO. | : 11/757586 | |
| DATED | : April 21, 2015 | |
| INVENTOR(S) | : Eibye | |

It is certified that error appears in the above-identified patent and that said Letters Patent is hereby corrected as shown below:

In the claims

Claim 8, column 9, lines 4-5, delete "language-associated with geographic" insert --language associated with geographic location information--

Signed and Sealed this
Twentieth Day of October, 2015

Michelle K. Lee
*Director of the United States Patent and Trademark Office*